Aug. 28, 1962     J. A. DUKE     3,051,038
TEMPERATURE MEASURING APPARATUS
Filed Oct. 21, 1958
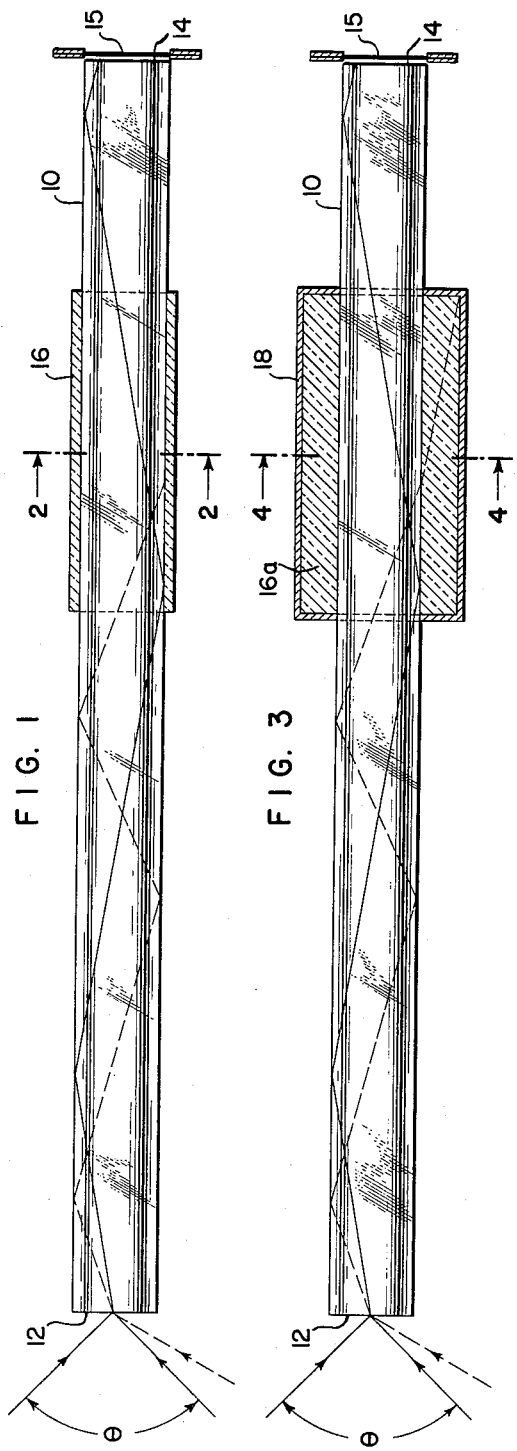
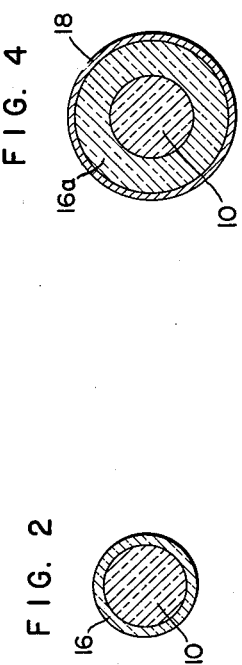
INVENTOR.
JOHN A. DUKE
BY Arthur H. Swanson
ATTORNEY.

United States Patent Office 3,051,038
Patented Aug. 28, 1962

3,051,038
TEMPERATURE MEASURING APPARATUS
John A. Duke, Roslyn, Pa., assignor to Minneapolis-Honeywell Regulator Company, Minneapolis, Minn., a corporation of Delaware
Filed Oct. 21, 1958, Ser. No. 768,578
3 Claims. (Cl. 88—22.5)

An object of the present invention is to provide an apparatus to limit the sighting angle of guides which are used to transmit radiant energy from one location to another.

Another object of the present invention is to provide a coating for the aforementioned type of guide which coating can be arranged to selectively restrict the sighting angle of the guide.

Prior to the present invention it has frequently been desirable to employ various types of optical devices, such as aperture stops, field stops, limiting apertures, or lenses adjacent the ends of light guides in order to either selectively restrict the area adjacent the light receiving end of the guide from which light rays can enter the guide and/or modify the area through which only certain selective rays of light exiting from the other end of the guide can be transmitted to a light detector.

In recent years instrumentation engineers have been confronted with the ever increasing concern of providing a way of economically reducing the overall size of light guides and their necessary component parts such as the previously referred to optical devices. To this end it is therefore a more specific object of the present invention to disclose an arrangement in which a coating of material, having an index of refraction greater than unity but less than the index of refraction of the guide, may be applied to a selective length of the outer surface of the guide, which will allow only certain selective bands of radiation entering one end of the guide to pass out its other end.

Another specific object of the invention is to provide one form of the aforementioned coated guide in which a coating, such as the material referred to by the trade name of Pyrex is of a type that possesses the inherent capacity of absorbing all of the undesirable radiant energy which orginates from a source outside a preselective sighting angle of the guide.

Another specific object of the present invention is to employ a modified form of the aforementioned coated guide having an initial layer which possesses a fairly highly absorption characteristic with respect to undesirable radiant energy which orginates from a source located outside a preselective sighting angle of the guide and in which this initial layer is coated a second layer of material which will completely absorb all of the undesirable radiant energy that enters the initial layer.

In the drawing:

FIG. 1 shows a longitudinal sectional view of one form of the invention in which a guide is provided with a single coating to limit its sighting angle;

FIG. 2 is a sectional view taken along the line 2—2 of FIG. 1;

FIG. 3 is a view similar to FIG. 1 illustrating a modified form of the invention in which two different superimposed coatings are provided on a portion of the outer peripheral surface of the guide to limit the sighting angle and FIG. 4 is a sectional view taken along the line 4—4 of FIG. 3.

Referring now to the drawing in detail and particularly to FIGS. 1 and 2, the reference character 10 designates a radiant energy transmitting guide of a highly refractive material having optically smooth surfaces. Preferably, guide 10 is of a rod-shaped configuration and is made of a transparent material such as sapphire. It should be understood that guides which are made of quartz, of acrylin resin or methyle methacrylate plastic materials of a thermoplastic type, for example the commercially available material referred to by the name of Plexiglas or Lucite, may also be used.

This guide 10 may be up to eighteen inches or more in length. Normally, one end 12 of guide 10 is disposed in a position to receive radiant energy and the other end 14 thereof is disposed in operative relationship with a means responsive to this radiant energy, such as for instance, the thermopile 15. If no means for limiting the sighting angle of the sapphire guide rod 10 is provided, then some of the radiant energy approaching the end 12 of guide rod 10 at substantially right angles to the longitudinal axis of the rod will enter the rod and be transmitted therethrough out its end 14 to the thermopile 15.

In accordance with one form of the present invention as shown in FIG. 1, a coating 16 of a material such as the material referred to by the trade name of Pyrex is applied in surface to surface contact with a portion of the peripheral surface of the guide 10 intermediate its ends 12 and 14. The characteristic of the coating 16 selected for this guide is such that it possesses the inherent capacity of absorbing all undesired radiant energy such as the energy represented in the dotted line form which orginates from any energy source that is outside the preselected sighting angle $\theta$. The characteristic of this coating material is also such that it possesses an index of refraction which is less than that of the sapphire guide 10 but which is greater than unity. With such a coating 16 applied, any radiant energy which enters the guide 12 at an angle greater than the preselected angle $\theta$ will pass out of the guide 10 permanently and into the coating 16.

Another substitute coating to that just described is shown in FIGS. 3 and 4. In this latter arrangement the initial layer of the material 16a may be made of a material similar to that described supra under the description of FIG. 1 such as the material referred to by the trademark of Pyrex except that the absorbtion characteristic of this material 16a is such that it will not absorb completely all the bands of radiant energy that are outside the preselected sighting angle $\theta$.

The coating 16a in FIGS. 3 and 4 is thus not made of a material which will absorb completely undesired radiant energy that is passing through the guide that is outside the sighting angle $\theta$ of the guide but instead the coating 16a is provided with an additional coating 18 superimposed thereon which latter coating is of a material that will completely absorb this undesirable radiant energy. This second radiant energy absorbing coating 18 is made of any suitable radiant energy absorbing material, such as for instance carbon black. By surrounding coating 16a with coating 18 any radiant energy passing from any ray, which is outside the sighting angle limit $\theta$ of the guide 10, which enters the guide in the manner shown in the dotted line condition indicated in FIG. 3, will enter coating 16a and then be absorbed by coating 18 and thereby eliminate the possibility of said radiant energy in the undesired radiation band region from being reflected and refracted back into guide 10. The theoretical basis for the present invention may be found in Snell's law and the guide coating means for limiting the sighting angle of the guide 10 operates in effect to increase the critical angle of the guide rod and to selectively pass the undesired energy through the outer peripheral wall of the guide into either the coating 16 or 16a in accordance with the first order calculation under Snell's law. After the undesired energy is in either the coating 16 or 16a, it is absorbed either by the coating 16 itself as shown in FIG. 1, or by the additional coating 18 as shown in FIG. 2.

The length of the coating necessary to absorb radiant energy entering guide 10 at any angle greater than any given or predetermined sighting angle may be readily calculated once the index of refraction of either the coating 16 or 16a, 18 is known. For example, if a specific coating referred to by the trade name of Pyrex is used as coating 16a on a one-eighth inch sapphire rod and this coating is coated with carbon black as coating 18, then the coatings need only extend about one-quarter of an inch in the longitudinal direction of guide 10 in order to reduce the sighting angle of the guide 10 from approximately 90° to approximately 60° with minimum definition, or sharpness. For greater definition, or sharpness, the length must be increased.

Other predetermined sighting angles may be obtained by using coatings of other indices of refraction and varying degrees of definitions obtained by use of varying lengths of coatings selected in accordance with the value of these indices. A desired length of the coating on the guide 10 is readily selected so that all radiant energy that is applied to the left end of the guide at any angle, which is outside of the sighting angle of the guide, will be able to strike the rod surfaces where the coating is to be placed at least once as it passes through the guide.

Since the angle at which all radiant energy that is applied to the left end of the guide 10 at any angle within the sighting angle of the guide which strikes the coating will be at an angle greater than the critical angle existing between the guide and the coating, such energy will be reflected back into the guide immediately without entering the coating and thence be transmitted by total internal reflection to the right end of the rod.

It is often necessary to subject the radiant energy receiving end 12 of the guide 10 to high temperatures which a lense or any one of the aforementioned other optical devices may not be able to withstand. By employing the present invention, the single coating 16 or a dual coating 16a, 18 may be placed on the guide 10 adjacent its cool end to eliminate, or at least reduce the deleterious effects of heat on the coating material.

From the aforementioned remarks it can be seen that by employing the type of coating described supra to a radiant energy transmitting guide 10 the need for relying on optical devices such as apertures stops, field stops, limiting apertures, or lenses to limit the sighting angle of guide 10 is obviated. The present invention thus relates to coated guide rods the use of which are particularly desirable over devices of the aforementioned type not only from a cost stand-point but also because such coated guide rods will require much less installation space than those which are required to employ any one or more ancillary optical devices, such as aperture stops, field stops limiting apertures and lenses.

I claim:

1. An apparatus for measuring the temperature of a preselected area of a heated environment, comprising a single radiant energy transmitting rod of a unitary construction, one end of the rod being positioned immediately adjacent the heated environment to receive rays of radiant energy emitted therefrom, a coating surrounding a preselected length of the rod at an opposite cold end portion thereof, said coating having an index of refraction greater than unity and less than that of the rod, the coating being so selected that it will absorb substantially all of the rays of radiant energy that enter the rod which are emitted from portions of the heated environment that are outside the preselected area and to simultaneously allow those rays of radiant energy which are emitted from the preselected area of the heated environment to be transmitted through and out of the cold end of the rod, and a means positioned adjacent the cold end of the rod to measure the radiant energy emitted therefrom.

2. In a pyrometric apparatus for transmitting changes in the temperature of a preselected area of a heated environment to a temperature detector, comprising a single sapphire rod of a unitary construction, one end of the rod being positioned adjacent the heated environment to receive rays of radiant energy emitted therefrom, a coating surrounding a preselected length of the rod at an opposite cold end portion thereof, said coating having an index of refraction greater than unity and less than that of the rod, the coating being so selected that it will absorb substantially all of the rays of radiant energy that enters the rod which are emitted from portions of the heated environment that are outside the preselected area and to allow those rays of radiant energy which are emitted from within the preselected area of the heated environment to be transmitted through and out of the cold end of the rod to the temperature detector.

3. In a pyrometric apparatus for transmitting changes in the temperature of a preselected area of a heated environment to a temperature detector, comprising a single radiant energy transmitting guide of a unitary construction, one end of the guide being positioned adjacent the heated environment to receive rays of radiant energy emitted therefrom, a coating surrounding a preselected length of the guide at an opposite cold end portion thereof, said coating having an index of refraction greater than unity and less than that of the guide, the coating being so selected that it will absorb substantially all of the rays of radiant energy that enters the guide which are emitted from portions of the heated environment that are outside the preselected area and to allow those rays of radiant energy which are emitted from within the preselected area of the heated environment to be transmitted through and out of the cold end of the guide to the temperature detector.

References Cited in the file of this patent
UNITED STATES PATENTS

| | | |
|---|---|---|
| 2,354,591 | Goldsmith | July 25, 1944 |
| 2,825,260 | O'Brien | Mar. 4, 1958 |